United States Patent [19]
Chikuni et al.

[11] Patent Number: 5,786,414
[45] Date of Patent: Jul. 28, 1998

[54] BUILDING RUBBER MEMBERS AND METHOD FOR IMPARTING HYDROPHILIC SURFACE THERETO

[75] Inventors: Makoto Chikuni; Toshiya Watanabe; Makoto Hayakawa, all of Kitakyushu; Tsuneo Kimura, Usui-gun; Akira Yamamoto, Usui-gun; Hironao Fujiki, Usui-gun, all of Japan

[73] Assignees: Toto Ltd., Fukuoka-ken; Shin-Etsu Chemical Co., Ltd., Tokyo, both of Japan

[21] Appl. No.: 770,425

[22] Filed: Dec. 20, 1996

[30] Foreign Application Priority Data

Dec. 22, 1995 [JP] Japan ................................. 7-350272

[51] Int. Cl.$^6$ .................................... C08J 3/28; C08J 3/24
[52] U.S. Cl. ........................... 524/413; 524/588; 524/483; 522/66; 522/99; 522/148
[58] Field of Search ..................... 524/588, 413, 524/783; 522/66, 99, 148

[56] References Cited

U.S. PATENT DOCUMENTS

| 4,203,886 | 5/1980 | Hirai et al. ............... 260/37 SB |
| 5,424,354 | 6/1995 | Takeoka ..................... 524/497 |
| 5,547,823 | 8/1996 | Murasawa et al. ........... 430/531 |
| 5,616,532 | 4/1997 | Heller et al. ............... 502/242 |

*Primary Examiner*—Margaret W. Glass
*Attorney, Agent, or Firm*—Millen, White, Zelano & Branigan, P.C.

[57] ABSTRACT

By curing a curable organopolysiloxane composition comprising an organopolysiloxane and photocatalytic particles, typically of titanium oxide, there is obtained a rubber member. A surface of the rubber member can be rendered hydrophilic or non-staining by irradiating UV radiation to the surface. The rubber member is thus useful as a building seal, coating and gasket.

17 Claims, No Drawings

BUILDING RUBBER MEMBERS AND METHOD FOR IMPARTING HYDROPHILIC SURFACE THERETO

BACKGROUND OF THE INVENTION

1. Field of the Invention

This invention relates to building rubber members which are used as sealing members, coating members or gaskets and a method for imparting a hydrophilic surface thereto.

2. Prior Art

In general, joints between concrete blocks, glazing edges along window frames or the like in various buildings are sealed by filling sealing compounds, typically synthetic rubber therein. There are known a variety of sealing compounds including silicone, polysulfide, polyurethane, acryl, SBR, and butyl systems. Among others, silicone base sealing compounds of the condensation curing type are widely used because of adhesion, heat resistance, weather resistance, and durability. As to solid gaskets, peroxide curing type silicone base gaskets are often used. More recently proposed approaches include overcoating of peroxide-curing type silicone base gaskets with UV-curing silicone base coating compounds and formation of glazing-integrated gaskets involving placing a molding frame around glazing, casting a platinum catalyzed addition vulcanizable silicone rubber composition, and curing the silicone rubber to the glazing.

From the past, silicone base sealing compounds and gaskets were used in exterior wall joints, but suffered from the problem of stain spread around the joint. This phenomenon largely depends on the location conditions (ambient environment and orientation) of a building, joint design parameters (shape and adherend) or the like and is now known to be closely correlated to the degree of atmospheric pollution around the building, flow of rain water, and dryness after rain. Countermeasures include a change of joints to ones not in direct contact with falling rain, such as recessed joints and sub-joints, and application of a coating agent to the surface of cured sealant or gasket to form a barrier to prevent staining. The former presents a problem of building design because design specifications must be altered. The latter adds a coating step to thereby increase the overall expense. For this reason, these countermeasures are not generally accepted.

SUMMARY OF THE INVENTION

Therefore, an object of the present invention is to provide a building rubber member having improved non-staining properties. Another object of the present invention is to provide a method for imparting a hydrophilic surface to the building rubber member.

Attempting to form building rubber members such as sealing members, coating members and gaskets from cured products of a curable organopolysiloxane composition in which particles of titanium oxide, zinc oxide, etc. having photocatalytic activity are dispersed, we have found that when these rubber members are exposed to ultraviolet radiation, their surface is modified to be hydrophilic or non-staining without detracting from the physical properties of the members.

Accordingly, the present invention provides a building rubber member formed from a cured product of a curable organopolysiloxane composition comprising an organopolysiloxane and photocatalytic particles dispersed therein.

In another aspect, the present invention provides a method for imparting a hydrophilic surface to a building rubber member as defined just above, comprising the step of irradiating ultraviolet radiation to a surface of the building rubber member.

DETAILED DESCRIPTION OF THE INVENTION

According to the present invention, a curable organopolysiloxane composition comprising an organopolysiloxane and photocatalytic particles is cured into a cured product or silicone rubber, of which a building rubber member is constructed.

The curable organopolysiloxane composition according to the invention is based on a diorganopolysiloxane while its curing system is not critical. A choice may be made among well-known compositions including organopolysiloxane compositions vulcanizable with organic peroxides, condensation curing type compositions, platinum catalyzed addition vulcanizing type compositions, and radiation curable compositions.

The organopolysiloxane used herein is preferably of the average compositional formula: $R_aSiO_{(4-a)/2}$ wherein R is independently selected from substituted or unsubstituted monovalent hydrocarbon groups having 1 to 12 carbon atoms, especially 1 to 10 carbon atoms and letter a is a number of 1.90 to 2.05. Examples of the hydrocarbon group include alkyl groups such as methyl, ethyl, propyl, butyl, 2-ethylbutyl and octyl; cycloalkyl groups such as cyclohexyl and cyclopentyl; alkenyl groups such as vinyl, hexenyl and allyl; aryl groups such as phenyl, tolyl, xylyl, naphthyl, and diphenyl; aralkyl groups such as benzyl and phenylethyl; and substituted ones of these groups wherein all or some of the hydrogen atoms each attached to a carbon atom are replaced by halogen atoms or cyano groups, such as chloromethyl, trifluoropropyl, 2-cyanoethyl and 3-cyanopropyl.

Where the organopolysiloxane composition is of the condensation curing type, the base of the curable organopolysiloxane composition should be an organopolysiloxane blocked with a hydroxyl group at each end of its molecular chain. In order that the present composition cure into a rubber product having better physical properties and mechanical strength, use of an organopolysiloxane having a viscosity of at least 25 centistokes at 25° C., especially 100 to 1,000,000 centistokes at 25° C. is recommended. The crosslinking agent for this organopolysiloxane is a silane or siloxane compound having two or more hydrolyzable groups in a molecule. Examples of the hydrolyzable group include alkoxy groups such as methoxy, ethoxy and butoxy; ketoxime groups such as dimethylketoxime and methylethylketoxime; acyloxy groups such as acetoxy; alkenyloxy groups such as isopropenyloxy and isobutenyloxy; amino groups such as N-butylamino and N,N-diethylamino; and amide groups such as N-methylacetamido. It is noted that about 2 to 50 parts, especially about 5 to 20 parts by weight of the crosslinking agent is blended per 100 parts by weight of the hydroxyl end-blocked organopolysiloxane.

Curing catalysts are generally used in the condensation type organopolysiloxane composition. Exemplary curing catalysts include alkyltin esters such as dibutyltin diacetate, dibutyltin dilaurate, and dibutyltin dioctoate; titanates or titanium chelate compounds such as tetraisopropoxytitanium, tetra-n-butoxytitanium, tetrakis(2-ethylhexoxy)titanium, dipropoxybis(acetylacetonato) titanium, and titanium isopropoxyoctylene glycol; organometallic compounds such as zinc naphthenate, zinc stearate, zinc 2-ethyloctoate, iron 2-ethylhexoate, cobalt 2-ethylhexoate, manganese 2-ethylhexoate, cobalt naphthenate, and alkoxy-aluminum compounds; aminoalkyl-substituted alkoxysilanes such as 3-aminopropyltriethoxysilane and N-β-(aminoethyl)-γ-aminopropyltrimethoxysilane; amine compounds and salts thereof such as hexylamine and dodecylamine phosphate; quaternary ammonium salts such as benzyltriethylammonium acetate; alkali metal salts of lower fatty acids such as potassium acetate, sodium acetate, and lithium oxalate; dialkylhydroxylamines such as dimethylhydroxylamine and diethylhydroxylamine; and silanes or siloxanes having a guanidyl group such as tetramethylguanidylpropyltrimethoxysilane, tetramethylguanidylpropylmethyldimethoxysilane, and tetramethylguanidylpropyltris(trimethylsiloxy)silane. These curing catalysts may be used alone or in admixture of two or more. It is noted that 0 to about 10 parts, especially about 0.01 to 5 parts by weight of the curing catalyst is blended per 100 parts by weight of the organopolysiloxane.

Where the organopolysiloxane composition is of the platinum addition curing type, an organopolysiloxane having at least two alkenyl groups at an end and/or midway of a molecular chain should preferably be used as the base of the composition. It preferably has a viscosity of 100 to 10,000,000 centistokes at 25° C. The composition further contains a crosslinking agent which is an organohydrogenpolysiloxane having at least two SiH groups in a molecule. Any of well-known organohydrogenpolysiloxanes may be used although those having a viscosity of less than 300 centistokes at 25° C. are preferred. It is preferably used in such an amount that 0.3 to 10 mol, especially 0.5 to 5 mol of SiH group may be available per mol of alkenyl group in the base organopolysiloxane. A catalytic amount of curing catalyst may be added to the composition. Any of well-known addition reaction catalysts may be used although metals of Groups VIII and compounds thereof, especially platinum and compounds thereof are preferred. Exemplary platinum compounds are chloroplatinic acid and complexes of platinum with olefins, etc.

Where the organopolysiloxane composition is of the peroxide vulcanizing type, an organopolysiloxane having a vinyl group at an end and/or midway of a molecular chain and a viscosity of about 100,000 to 10,000,000 centistokes at 25° C. should preferably be used as the base of the composition. Organic peroxides are useful curing catalysts. Exemplary organic peroxides include alkyl organic peroxides such as dicumyl peroxide and di-t-butyl peroxide; and acyl organic peroxides such as benzoyl peroxide and 2,4-dichlorobenzoyl peroxide. About 0.1 to 10 parts, especially about 0.2 to 5 parts by weight of the organic peroxide is preferably blended per 100 parts by weight of the organopolysiloxane.

Where the organopolysiloxane composition is of the radiation curing type, an organopolysiloxane having an aliphatic unsaturated group (such as vinyl, allyl, alkenyloxy, acryl and methacryl), mercapto group, epoxy group, and hydrosilyl group at an end and/or midway of a molecular chain should preferably be used as the base of the composition. A reaction initiator is blended in the composition. Examples of the reaction initiator include acetophenone, propiophenone, benzophenone, xanthol, fluorene, benzaldehyde, anthraquinone, triphenylamine, carbazole, 3-methylacetophenone, 4-methylacetophenone, 3-pentylacetophenone, 4-methoxyacetophenone, 3-bromoacetophenone, 4-allylacetophenone, p-diacetylbenzene, 3-methoxybenzophenone, 4-methylbenzophenone, 4-chlorobenzophenone, 4,4-dimethoxybenzophenone, 4-chloro-4'-benzylbenzophenone, 3-chloroxanthol, 3,9-dichloroxanthol, 3-chloro-8-nonylxanthol, benzoin, benzoin methyl ether, benzoin butyl ether, bis(4-dimethylaminophenyl)ketone, benzyl methoxyketal, and 2-chlorothioxanthol. About 0.1 to 20 parts, especially about 0.5 to 10 parts by weight of the initiator is preferably blended per 100 parts by weight of the organopolysiloxane.

In the organopolysiloxane composition according to the invention is blended particles having photocatalytic activity, which are simply referred to as photocatalytic particles. The photocatalytic particles used herein should have sufficiently high photocatalytic activity to decompose organic groups which are present at a coating surface and cause the surface to be hydrophobic.

Any desired one of photocatalysts may be used insofar as they have high photocatalytic activity. Titanium oxide, zinc oxide, tin oxide, ferric oxide, tungsten trioxide, dibismuth trioxide, and strontium titanate are exemplary of the photocatalysts which upon exposure to light of a specific wavelength or shorter, electrons in the valence electron band are excited to the conduction band to create conducting electrons and holes. Preferred among others are titanium oxide and zinc oxide. Titanium oxide for photocatalyst is especially preferred because it is chemically stable and inexpensive. The particulate type of titanium oxide is not critical although anatase type titanium oxide which is chemically stable and inexpensive is preferred. Titanium oxide increases photocatalytic activity as the mean particle size of its particles is smaller. It is thus recommended to use titanium oxide particles having a particle size of 0.1 μm or less, especially 20 nm or less. The mean particle size used herein is determined according to Scherrer's formula from an integral width of a maximum peak of crystal observed on powder X-ray diffraction of particles. Titanium oxide particles may be used in the form of powder, sol dispersed in a dispersing medium or paste containing water or solvent. The dispersing medium for sol is water, alcohols such as methanol, ethanol, isopropanol, n-butanol, and isobutanol, and ketones such as methyl ethyl ketone and methyl isobutyl ketone.

It is noted that the titanium oxide photocatalyst is titanium oxide or its aggregate consisting of unit lattices having continuous periodicity of such an order as to have sufficient nature to create electrons and holes upon exposure to photons having greater energy than the forbidden bandwidth. Its crystallographic system may be any of anatase, rutile, and buchite types. Insofar as titanium oxide possesses the above-mentioned nature, a metal other than titanium may be in contact with or form a solid solution with titanium oxide. The continuous periodicity of such an order as to have sufficient nature to create electrons and holes is at least such that a highest peak of crystal is observable upon powder X-ray diffractometry under conditions of 50 kV and 300 mA.

The titanium oxide creates electrons or holes which act on a surface of cured silicone rubber to render the surface hydrophilic. This is probably because some of organic groups at the silicone rubber surface react with active oxygen species such as hydroxyl radicals created by reaction of holes with hydroxyl groups and superoxide ions created by reaction of electrons with oxygen, forming hydroxyl groups at the surface. However, as a result of our long-term light resistance test, it was found by Raman spectroscopy that upon exposure to ultraviolet radiation of an intensity approximate to the solar light level, this reaction takes place only in a sub-surface layer, but not in the bulk of the silicone rubber.

The photocatalytic titanium oxide is obtained by well-known techniques as disclosed in JP-A 171408/1995, for example, by subjecting titanium compounds such as titanyl sulfate, titanyl chloride and titanium alkoxides to thermal hydrolysis, neutralization by alkali addition, gas phase oxidation, and firing or hydrothermal treatment.

In the curable organopolysiloxane composition according to the invention, about 5 to 40 parts, especially about 10 to 30 parts by weight of the above-defined photocatalytic particles is used per 100 parts by weight of the organopolysiloxane component. On this basis, less than 5 parts of the photocatalyst would impart less satisfactory non-staining properties to the surface of cured silicone rubber whereas more than 40 parts of the photocatalyst would rather detract from non-staining or hydrophilic properties and cause building rubber members to lose elasticity, failing to provide a tight seal.

Preferably the photocatalytic particles should have a water content of 1% by weight or less, especially when the organopolysiloxane composition is applied to building rubber members such as sealing members, coating members and gaskets. In incorporating photocatalytic particles in an organopolysiloxane, if the photocatalytic particles contain more than 1% by weight of water, the organopolysiloxane composition tends to thicken or expand during milling, losing sealing properties.

A variety of additives may be added to the organopolysiloxane composition of the invention insofar as non-staining properties are not impaired. Useful additives include thixotropic agents such as polyethylene glycol and derivatives thereof; reinforcing fillers such as fumed silica, precipitated silica, quartz flour, carbon powder, talc and bentonite; fibrous fillers such as asbestos, glass fibers, carbon fibers and organic fibers; basic fillers such as calcium carbonate, zinc carbonate, zinc oxide, magnesium oxide, and celite; heat resistance modifiers such as red iron oxide and cerium oxide; freeze resistance modifiers, dehydrating agents, anti-rusting agents, tackifiers such as γ-aminopropyltriethoxysilane; and liquid reinforcing agents such as network polysiloxane comprising triorganosiloxy units and $SiO_2$ units and/or monoorganosiloxy units. Such additives may be added in conventional amounts as needed.

The building rubber member of the invention is obtained by curing the above-mentioned curable organopolysiloxane composition and used as sealing members, coating members, gaskets or the like. With respect to the molding and curing of the curable organopolysiloxane composition, any of well-known techniques and conditions may be selected in accordance with a particular type of composition. The building rubber member thus obtained can be modified to have a hydrophilic surface by exposing it to ultraviolet radiation. Although this UV irradiation can be done by UV radiation in the ambient air or from fluorescent lamps, use of UV emitting equipment such as UV lamps is recommended because a total UV dose of at least 1 J/cm, especially at least 2 J/cm$^2$ is preferred.

There has been described a building rubber member of a photocatalytic particle-laden organopolysiloxane composition which can present a hydrophilic or non-staining surface upon exposure to UV radiation and form a tight seal. When the composition is applied as coating, filled in a joint crevice or used as a solid gasket, the resulting building rubber member does not cause staining to the building and at or around the joint. It also features weather resistance.

EXAMPLES

Examples of the present invention are given below by way of illustration and not by way of limitation. All parts are by weight. The viscosity is a measurement (centistokes) at 25° C.

COMPARATIVE EXAMPLE 1

A liquid sample No. 1 was prepared by mixing the following components under vacuum.

|  | Parts by weight |
| --- | --- |
| Dimethylpolysiloxane blocked with hydroxyl group at each end of molecular chain and having a viscosity of 20,000 cs | 100.00 |
| Fumed silica treated to have hydrophobic surface and having a specific surface area of 110 m$^2$/g | 10.0 |
| Methyltributanoximesilane | 10.0 |
| Dibutyltin dioctoate | 0.1 |

COMPARATIVE EXAMPLE 2

A liquid sample No. 2 was prepared by mixing the following components under vacuum.

|  | Parts by weight |
| --- | --- |
| Dimethylpolysiloxane blocked with hydroxyl group at each end of molecular chain and having a viscosity of 20,000 cs | 100.0 |
| Heavy calcium carbonate | 40.0 |
| Methyltributanoximesilane | 10.0 |
| Dibutyltin dioctoate | 0.1 |

COMPARATIVE EXAMPLE 3

A liquid sample No. 3 was prepared by mixing the following components under vacuum.

|  | Parts by weight |
| --- | --- |
| Dimethylpolysiloxane blocked with hydroxyl group at each end of molecular chain and having a viscosity of 20,000 cs | 100.0 |
| Pigment grade titanium oxide (Tipaque R-820 by Ishihara Industry K.K., particle size ~1,000 nm) | 40.0 |
| Methyltributanoximesilane | 10.0 |
| Dibutyltin dioctoate | 0.1 |

EXAMPLE 1

A liquid sample No. 4 was prepared by mixing the following components under vacuum.

|  | Parts by weight |
| --- | --- |
| Dimethylpolysiloxane blocked with hydroxyl group at each end of molecular chain and having a viscosity of 20,000 cs | 100.0 |
| Photocatalytic titanium oxide with a water content of 0.1% (Tipaque ST-01 by Ishihara Industry K.K., particle size 7 nm) | 40.0 |
| Methyltributanoximesilane | 10.0 |
| Dibutyltin dioctoate | 0.1 |

EXAMPLE 2

A liquid sample No. 5 was prepared by mixing the following components under vacuum.

|                                                                                                                                        | Parts by weight |
|----------------------------------------------------------------------------------------------------------------------------------------|-----------------|
| Dimethylpolysiloxane blocked with hydroxyl group at each end of molecular chain and having a viscosity of 20,000 cs                    | 100.0           |
| Photocatalytic titanium oxide with a water content of 0.1% (Tipaque ST-11 by Ishihara Industry K.K., particle size 20 nm)              | 40.0            |
| Methyltributanoximesilane                                                                                                              | 10.0            |
| Dibutyltin dioctoate                                                                                                                   | 0.1             |

EXAMPLE 3

A patty sample No. 6 was prepared by mixing the following components under vacuum in a mixer where the composition became significantly thickened.

|                                                                                                                    | Parts by weight |
|--------------------------------------------------------------------------------------------------------------------|-----------------|
| Dimethylpolysiloxane blocked with hydroxyl group at each end of molecular chain and having a viscosity of 20,000 cs | 100.0           |
| Photocatalytic titanium oxide with a water content of 2.0% (Tipaque ST-01 by Ishihara Industry K.K.)                | 40.0            |
| Methyltributanoximesilane                                                                                          | 10.0            |
| Dibutyltin dioctoate                                                                                               | 0.1             |

The organopolysiloxane compositions were shaped into sheets of 2 mm thick, which were allowed to stand in an atmosphere of 20° C. and RH 55% for 7 days, curing into rubber elastomers. Using a UV illuminating device, the elastomers on their surface were exposed to UV radiation at a dose of 36 J/cm$^2$. The treated surface of the elastomers was determined for contact angle with water, with the results shown in Table 1.

Separately, the organopolysiloxane compositions were applied to white glass plates to form a coating of 30×30×2 mm (thick) and allowed to stand in an atmosphere of 20° C. and RH 55% for 7 days, curing into rubber elastomers. The elastomers were allowed to stand outdoor for 3 months. the elastomers were visually observed for stain before and after the outdoor exposure. They were rated "OK" for non-stained and "S" for stained. The results are shown in Table 1.

TABLE 1

| Sample No. | CE1 1 | CE2 2 | CE3 3 | E1 4 | E2 5 | E3 6 |
|---|---|---|---|---|---|---|
| Contact angle with water (°) | | | | | | |
| Initial | 110 | 114 | 114 | 114 | 114 | 114 |
| After UV exposure | 110 | 111 | 111 | 77 | 83 | 88 |
| Staining by outdoor exposure | | | | | | |
| Initial | OK | OK | OK | OK | OK | OK |
| After 3 months | S | S | S | OK | OK | OK |

COMPARATIVE EXAMPLE 4

A liquid sample No. 7 was prepared by mixing the following components under dry conditions.

|                                                                                                                    | Parts by weight |
|--------------------------------------------------------------------------------------------------------------------|-----------------|
| Dimethylpolysiloxane blocked with hydroxyl group at each end of molecular chain and having a viscosity of 5,000 cs | 100.0           |
| Precipitated silica                                                                                                | 20.0            |
| Vinyltriisopropenyloxysilane                                                                                       | 6.0             |
| Tetramethylguanidylpropyltrimethoxysilane                                                                          | 0.5             |

EXAMPLE 4

A liquid sample No. 8 was prepared by mixing the following components under dry conditions.

|                                                                                                                    | Parts by weight |
|--------------------------------------------------------------------------------------------------------------------|-----------------|
| Dimethylpolysiloxane blocked with hydroxyl group at each end of molecular chain and having a viscosity of 5,000 cs | 100.0           |
| Photocatalytic titanium oxide (Tipaque ST-01 by Ishihara Industry K.K.)                                            | 20.0            |
| Vinyltriisopropenyloxysilane                                                                                       | 6.0             |
| Tetramethylguanidylpropyltrimethoxysilane                                                                          | 0.5             |

EXAMPLE 5

A liquid sample No. 9 was prepared by mixing the following components under dry conditions.

|                                                                                                                    | Parts by weight |
|--------------------------------------------------------------------------------------------------------------------|-----------------|
| Dimethylpolysiloxane blocked with hydroxyl group at each end of molecular chain and having a viscosity of 5,000 cs | 100.0           |
| Photocatalytic titanium oxide (Tipaque ST-11 by Ishihara Industry K.K.)                                            | 20.0            |
| Vinyltriisopropenyloxysilane                                                                                       | 6.0             |
| Tetramethylguanidylpropyltrimethoxysilane                                                                          | 0.5             |

The organopolysiloxane compositions were applied to white glass plates to form a coating of 30×30×2 mm (thick) and allowed to stand in an atmosphere of 20° C. and RH 55% for 7 days, curing into rubber elastomers. The elastomers were allowed to stand outdoor for 6 months. The elastomers were visually observed for stain before and after the outdoor exposure. They were rated "OK" for non-stained and "S" for stained. The results are shown in Table 2.

TABLE 2

| Staining by outdoor exposure | Sample No. | CE4 7 | E4 8 | E5 9 |
|---|---|---|---|---|
| Initial | | OK | OK | OK |
| After 3 months | | S | OK | OK |
| After 6 months | | S | OK | OK |

EXAMPLE 6

|                                                                                                                 | Parts by weight |
|-----------------------------------------------------------------------------------------------------------------|-----------------|
| Dimethylpolysiloxane blocked with vinyl group at each end of molecular chain and having a viscosity of 3,000 cs | 97.0            |
| SiH-containing dimethylpolysiloxane                                                                             | 3.0             |

| | Parts by weight |
|---|---|
| having a viscosity of 20 cs | |
| Photocatalytic titanium oxide (Tipaque ST-01 by Ishihara Industry K.K.) | 30.0 |
| Chloroplatinic acid in isopropanol | 50 ppm of Pt (per million parts of the siloxanes) |

A liquid sample No. 10 was prepared by mixing the above components. It was cured at 20° C. for 24 hours, obtaining a gasket of 50×30×210 mm.

EXAMPLE 7

| | Parts by weight |
|---|---|
| Dimethylpolysiloxane consisting of 94.5 mol % of dimethylsiloxane units, 0.5 mol % of methylvinylsiloxane units, and 5 mol % of diphenylsiloxane units, blocked with trimethylsilyl group at each end of molecular chain and having a viscosity of 100,000 cs | 100.0 |
| Dicumyl peroxide | 0.5 |
| Photocatalytic titanium oxide (Tipaque ST-01 by Ishihara Industry K.K.) | 30.0 |

A liquid sample No. 11 was prepared by mixing the above components. It was press molded at 180° C. for 10 minutes, obtaining a gasket of 50×30×210 mm.

EXAMPLE 8

| | Parts by weight |
|---|---|
| Dimethylpolysiloxane blocked with bis-(acryloxymethyldimethylsiloxy)methylsilyl group at each end of molecular chain and having a viscosity of 3,000 cs | 100.0 |
| Diethoxyacetophenone | 3.0 |
| Photocatalytic titanium oxide (Tipaque ST-01 by Ishihara Industry K.K.) | 30.0 |

A liquid sample No. 12 was prepared by mixing the above components. It was exposed to UV radiation three times by moving it under a high pressure mercury lamp of 80 W/cm spaced a distance of 10 cm at a conveyor speed of 1 m/min., obtaining a gasket of 50×30×210 mm.

Samples similarly cured, but dimensioned 30×30×1 mm (thick) were secured to white glass plates by bolts and allowed to stand outdoor for 6 months. The samples were visually observed for stain before and after the outdoor exposure. They were rated "OK" for non-stained and "S" for stained. The results are shown in Table 3.

TABLE 2

| | | E6 | E7 | E8 |
|---|---|---|---|---|
| Staining by outdoor exposure | Sample No. | 10 | 11 | 12 |
| Initial | | OK | OK | OK |
| After 3 months | | OK | OK | OK |
| After 6 months | | OK | OK | OK |

EXAMPLE 9

A cured sample was obtained by the same procedure as in Example 4 except that 50.0 parts of photocatalytic titanium oxide was blended. After the same outdoor exposure test, it was rated to be somewhat staining by visual observation.

Gaskets were prepared using the organopolysiloxane compositions of Examples 4 and 9 and examined for seal tightness by an H type block test according to JIS K 6301. The gasket of the composition of Example 4 showed an elongation of 50%, achieving a perfect seal. The gasket of the composition of Example 9 showed an elongation of 10% and provided an inferior seal to that of Example 4 because it somewhat lacked elasticity due to the increased titanium oxide content.

While only certain preferred features of the invention have been described herein, many modifications and changes will occur to those skilled in the art. It is, therefore, to be understood that the appended claims are intended to cover all such modifications and changes as fall within the true spirit of the invention.

We claim:

1. A building rubber member comprising a cured product of a curable organopolysiloxane composition comprising a diorganopolysiloxane and photocatalytic particles having a water content up to 1% by weight dispersed therein, said building rubber member having a hydrophilic surface from exposure to ultraviolet radiation.

2. A method for providing a building rubber member with a hydrophilic surface, said building rubber member comprising 100 parts by weight of an organopolysiloxane and 5 to 40 parts by weight of photocatalytic particles having a particle size of 0.1 μm or less, said organopolysiloxane having the average compositional formula:

$$R_aSiO_{(4-a)/2}$$

wherein R is independently selected from substituted or unsubstituted monovalent hydrocarbon groups having 1 to 12 carbon atoms and a is 1.90 to 2.05, said photocatalytic particles having a water content of up to 1% by weight, said method comprising irradiating a surface of said building rubber member with UV radiation.

3. A building rubber member comprising a cured product of a curable organopolysiloxane composition comprising 100 parts by weight of an organopolysiloxane and 5 to 40 parts by weight of photocatalytic particles having a particle size of 0.1 μm or less, said organopolysiloxane having the average compositional formula:

$$R_aSiO_{(4-a)/2}$$

wherein R is independently selected from substituted or unsubstituted monovalent hydrocarbon groups having 1 to 12 carbon atoms and a is 1.90 to 2.05, said photocatalytic particles having a water content of up to 1% by weight, said building rubber member having a hydrophilic surface from exposure to ultraviolet radiation.

4. The building rubber member of claim 3 wherein said composition contains 100 parts by weight of the organopolysiloxane and 5 to 40 parts by weight of the photocatalytic particles.

5. The building rubber member of claim 3 wherein the photocatalytic particles are of titanium oxide or zinc oxide.

6. The building rubber member of claim 3 which is used as a sealing member, coating member or gasket.

7. The building rubber member of claim 3, which has a contact angle of 88° or less with water.

8. The building rubber member of claim 3, wherein the photocatalytic particles have a particle size of 20 nm or less.

9. The building rubber member of claim 8, wherein the amount of the photocatalytic particles is in the range of 10 to 30 parts by weight per 100 parts by weight of the organopolysiloxane.

10. The building rubber member of claim 3, wherein the curable organopolysiloxane composition comprises an organopolysiloxane blocked with a hydroxyl group at each end of its molecular chain, a silane or siloxane compound having two or more hydrolyzable groups in a molecule, and a condensation reaction catalyst.

11. The building rubber member of claim 3, wherein the curable organopolysiloxane composition comprises an organopolysiloxane having at least two alkenyl groups at an end and/or midway of a molecular chain, an organohydrogenpolysiloxane having at least two SiH groups in a molecule, and an addition reaction catalyst.

12. The building rubber member of claim 3, wherein the curable organopolysiloxane composition comprises an organopolysiloxane having a vinyl group at an end and/or midway point of a molecular chain, and an organic peroxide.

13. The building rubber member of claim 3, wherein the curable organopolysiloxane composition comprises an organopolysiloxane having an aliphatic unsaturated group, mercapto group, epoxy group or hydrosilyl group at an end and/or midway point of a molecular chain, and a reaction initiator.

14. The building rubber member of claim 3, wherein R is an alkyl, cycloalkyl, alkenyl, aryl or aralkyl group, optionally substituted by at least one halogen atom or cyano group.

15. The building rubber member of claim 3, wherein R is a methyl, ethyl, propyl, butyl, 2-ethylbutyl, octyl, cyclohexyl, cyclopentyl, vinyl, hexenyl, allyl, phenyl, tolyl, xylyl, naphthyl, diphenyl, benzyl, phenylethyl, chloromethyl, trifuoropropyl, 2-cyanoethyl or 3-cyanopropyl group.

16. The building rubber member of claim 3, wherein the photocatalytic particles are of titanium oxide, zinc oxide, tin oxide, ferric oxide, tungsten trioxide, dibismuth trioxide, strontium titanate.

17. A building rubber member comprising a cured product of a curable organopolysiloxane composition comprising an organopolysiloxane and photocatalytic particles having a water content of up to 1% by weight dispersed therein, said building rubber member having a hydrophilic surface from exposure to ultraviolet radiation, wherein the curable organopolysiloxane composition comprises one of the formula $R_a SiO_{(4-a)/2}$, wherein each R is independently an optionally substituted monovalent hydrocarbon group of 1–12 carbon atoms and a is 1.90 to 2.05.

* * * * *